(12) United States Patent
White

(10) Patent No.: US 7,403,969 B2
(45) Date of Patent: Jul. 22, 2008

(54) NETWORK CONFERENCING USING METHOD FOR DISTRIBUTED COMPUTING AND/OR DISTRIBUTED OBJECTS TO INTERMEDIATE HOST FOR PRESENTATION TO A COMMUNICATIONS DEVICE

(75) Inventor: Wesley White, Kennesaw, GA (US)

(73) Assignee: AT&T Delaware Intellectual Property, Inc., Wilmington, DE (US)

(*) Notice: Subject to any disclaimer, the term of this patent is extended or adjusted under 35 U.S.C. 154(b) by 870 days.

(21) Appl. No.: 10/853,872

(22) Filed: May 26, 2004

(65) Prior Publication Data
US 2005/0265533 A1  Dec. 1, 2005

(51) Int. Cl.
*G06F 15/16* (2006.01)
(52) U.S. Cl. ...................................... 709/204
(58) Field of Classification Search .......... 709/204–206
See application file for complete search history.

(56) References Cited

U.S. PATENT DOCUMENTS

| | | | |
|---|---|---|---|
| 4,736,407 A | 4/1988 | Dumas | |
| 4,796,293 A | 1/1989 | Blinken et al. | |
| 5,530,472 A | 6/1996 | Bregman et al. | |
| 5,537,548 A | 7/1996 | Fin | |
| 5,659,692 A | 8/1997 | Poggio | |
| 5,701,301 A | 12/1997 | Weisser, Jr. | |
| 5,784,561 A | 7/1998 | Bruno et al. | |
| 5,822,525 A | 10/1998 | Tafoya | |
| 5,838,774 A | 11/1998 | Weisser, Jr. | |
| 5,844,979 A * | 12/1998 | Raniere et al. | 379/202.01 |
| 5,854,893 A | 12/1998 | Ludwig | |
| 5,884,032 A | 3/1999 | Bateman et al. | |
| 5,978,463 A | 11/1999 | Jurkevics et al. | |
| 5,978,806 A | 11/1999 | Lund | |
| 5,995,608 A | 11/1999 | Detampel, Jr. et al. | |
| 5,999,966 A | 12/1999 | McDougall et al. | |
| 6,049,602 A | 4/2000 | Foladare et al. | |
| 6,064,730 A | 5/2000 | Ginsberg | |
| 6,108,687 A * | 8/2000 | Craig | 709/203 |
| 6,148,068 A | 11/2000 | Lowery | |
| 6,181,786 B1 | 1/2001 | Detampel, Jr. et al. | |
| 6,233,605 B1 | 5/2001 | Watson | |
| 6,446,113 B1 | 9/2002 | Ozzie | |
| 6,560,637 B1 | 5/2003 | Dunlap | |
| 6,654,785 B1 * | 11/2003 | Craig | 709/203 |
| RE38,457 E * | 3/2004 | Rothrock et al. | 370/261 |
| 6,714,635 B1 | 3/2004 | Adams et al. | |
| 6,791,974 B1 | 9/2004 | Greenberg | |
| 6,857,009 B1 * | 2/2005 | Ferreria et al. | 709/219 |
| 6,907,449 B2 * | 6/2005 | Srinivasan | 709/204 |
| 2002/0188678 A1 | 12/2002 | Edecker | |
| 2003/0093476 A1 | 5/2003 | Syed | |

* cited by examiner

*Primary Examiner*—William C. Vaughn, Jr.
*Assistant Examiner*—Yemane Mesfin
(74) *Attorney, Agent, or Firm*—Scott P. Zimmerman, PLLC

(57) ABSTRACT

Prior to the intermediate host conference, an Intermediate Host Conferencing Module communicates a library of digital objects and the Intermediate Host Conferencing Module to an intermediate host communications device(s). During the conference, the intermediate host-resident Intermediate Host Conferencing Module receives a synchronization command and instructs the intermediate host communications device to communicate a synchronized object with presentation instructions to a downstream participant communications device and to present the synchronized object to the intermediate host communications device. Furthermore, the participant communications devices may communicate a synchronization acknowledgment back to the Intermediate Host Conferencing Module. The synchronization confirmation acknowledges a successful presentation of the synchronized object to the intermediate host communications device and/or to at least one of the downstream participant communications devices.

20 Claims, 11 Drawing Sheets

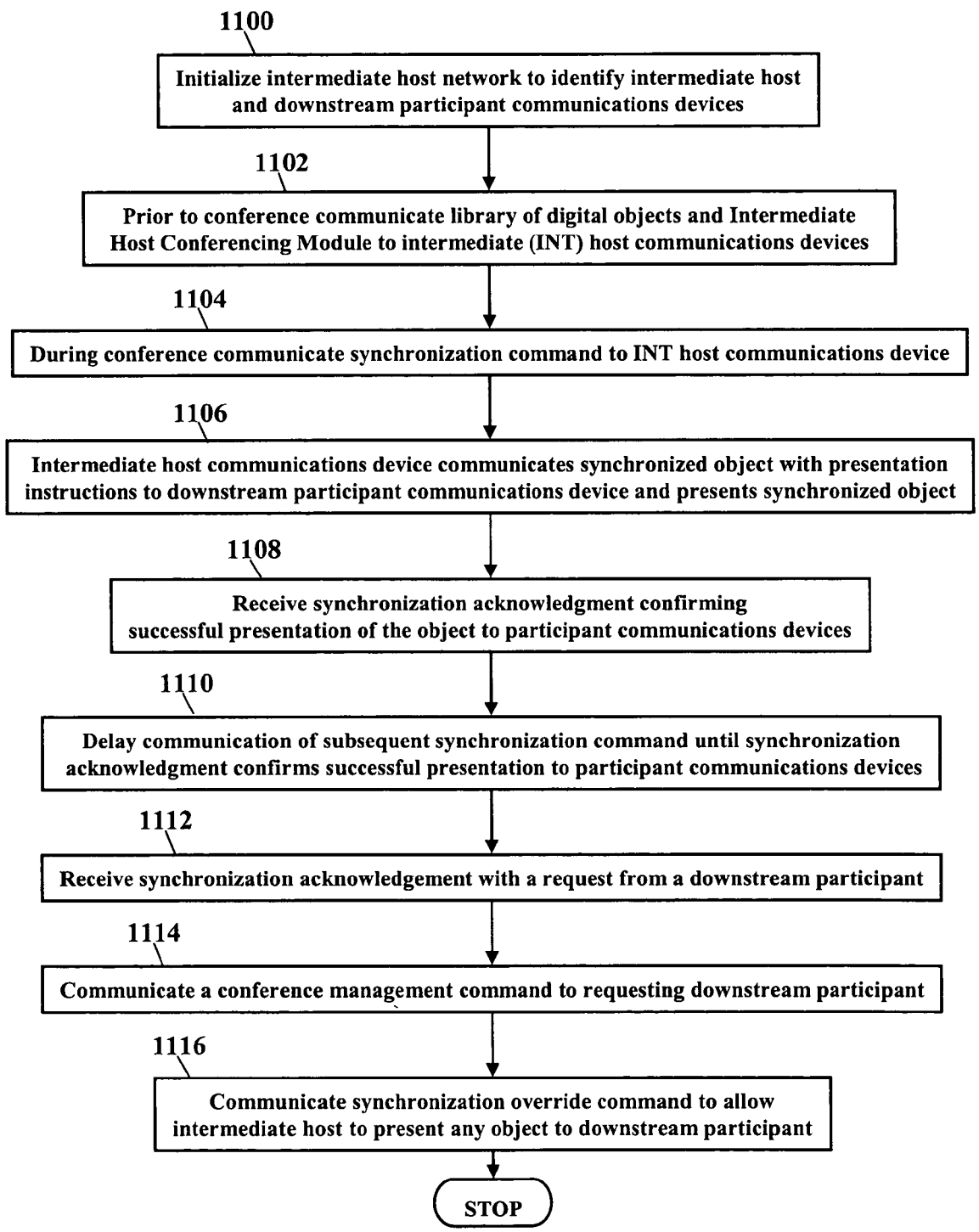

NETWORK CONFERENCING USING METHOD FOR DISTRIBUTED COMPUTING AND/OR DISTRIBUTED OBJECTS TO INTERMEDIATE HOST FOR PRESENTATION TO A COMMUNICATIONS DEVICE

CROSS-REFERENCE TO RELATED APPLICATIONS

This application relates to U.S. patent application Ser. No. 10/931.517. entitled "Methods, Systems and Products for Network Conferencing," filed Apr. 23, 2004, and of which the "Brief Summary of the Invention" and "Detailed Description of the Invention" sections are incorporated herein by this reference.

This application relates to U.S. patent application Ser. No. 10/853.871. entitled "Network Conferencing Using Method for Distributed Computing and/or Distributed Objects," filed May 26, 2004, and of which the "Brief Summary of the Invention" and "Detailed Description of the Invention" sections are incorporated herein by this reference.

This application relates to U.S. patent application Ser. No. 10/854.055. entitled "Network Conferencing Using Method for Concurrent Real Time Broadcast and Distributed Computing And/Or Distributed Computing And Distributed Objects," filed May 26, 2004, and of which the "Brief Summary of the Invention" and "Detailed Description of the Invention" sections are incorporated herein by this reference.

This application relates to U.S. patent application Ser. No. 10/854.324. entitled "Network Conferencing Using Method for Distributed Computing And/Or Distributed Objects For Presentation To A Mobile Communications Device," filed May 26, 2004, and of which the "Brief Summary of the Invention" and "Detailed Description of the Invention" sections are incorporated herein by this reference.

This application relates to U.S. patent application Ser. No. 10/854,452, entitled "Methods, Systems, and Products for Network Conferencing," filed May 26. 2004, and of which the "Brief Summary of the Invention" and "Detailed Description of the Invention" sections are incorporated herein by this reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to conferencing over telecommunications and/or data networks and, more particularly, to data transfer via an intermediate host for conferencing and for synchronizing.

2. Description of the Related Art

Bandwidth is a problem when conferencing. Video and/or desktop conferencing, such as training sessions and other distributed presentations, often requires real-time streaming of the presentation materials. If the remote participants are few in number, and if the file size of the presentation materials is manageable, then real-time data streaming may provide an adequate quality of presentation. If, however, there are a large number of remote participants or the file size of the materials is quite large, then real-time streaming poses problems. As the number of remote participants increases and/or as the file size of the presentation materials increases, the required bandwidth also increases. Fifty (50) remote participants, for example, require fifty (50) real-time data streams fanning out from the host computer. As the number of remote participants increases, the host computer is also taxed to manage communications with all the remote computers. All the participants to the conference, then, eventually suffer from network congestion and from degradation in processor performance. The quality of the conference is reduced, and all the participants to the conference have a less-than-desirable experience. There is, accordingly, a need in the art for methods, systems, and products for improved conferencing among remote participants. There is also a need for reducing the bandwidth required when conferencing that does not rely upon real-time streaming.

BRIEF SUMMARY OF THE INVENTION

The aforementioned problems, and other problems, are reduced by this invention. This invention comprises methods, computer systems, computer programs, and computer program products that improve conferencing among remote participants. This invention also leverages communication assets between an intermediate host (also referred to as an upstream participant) and one or more downstream participant communications devices. This invention does not require real-time streaming of presentation materials, so less bandwidth is required. This invention also includes features that help ensure all participants (i.e., an intermediate host participant communicating with the host and/or server as well as a downstream participant communicating with the intermediate host participant) are synchronized to the host's presentation. As the conference host progresses through the presentation, this invention identifies to the intermediate host which participants have viewed a current object (also referred to as the "synchronized object") of the presentation as well as which participants are lagging behind and/or jumping ahead in the presentation materials. This invention can even include additional conference management features for the intermediate host participant to manage the conference with the downstream participants. For example, the intermediate host participant can execute commands and/or instructions that enable a selected downstream participant to exit the conference, delay presentment of the conference, provide unrestricted access of the entire presentation, provide authority to distribute presentation materials to a non-participant of the conference, allow modifications to the presentation, modify a communications connection with the downstream participant, and/or other features. This invention, then, allows the intermediate host to synchronize and control presentation materials to the downstream participant and to provide conference management commands and/or instructions to the downstream participant communications device. Thus, the intermediate host is able to more quickly respond to the downstream participant because the intermediate host can provide commands, respond to requests, and/or provide synchronized presentation materials without having to communicate with the host. And, thereby, the intermediate host is able to leverage communication assets among the intermediate host and the downstream participant(s). Consequently, the intermediate host can tailor the conference to better suit the downstream participant(s).

This invention discloses methods, systems, and products for conducting a conference amongst an intermediate host communications network. One of the embodiments describes a method for synchronizing presentation objects to participants. Participants include at least one intermediate host communications device and at least one downstream participant communications device. Initially, at least one intermediate host communications device and at least one downstream participant communications device are determined. The intermediate host communications device is an upstream participant communications device in communication with a host communications device (and/or with a host server) and in communication with a downstream participant communications device. The downstream participant communications device is a participant communications device in communication with the intermediate host communications device. The downstream participant communications device may additionally or alternatively communicate with another participant communications device that is not in communication with the intermediate host communications device, the host communications device, and/or the host server device. Prior to the conference, a library of digital objects and an Intermediate Host Conferencing Module are communicated to the intermediate host communications device. Then, during the conference, a synchronization command is communicated from the host communications device and/or the server device to the intermediate host communications device to present an object (also referred to as the "synchronized object") from the library of digital objects. If the intermediate host communications device is a network communications device, then the synchronization command instructs the Intermediate Host Conferencing Module, now stored within the intermediate host communications device, to communicate the synchronized object with presentation instructions to the downstream participant communications device. The synchronization command instructs the Intermediate Host Conferencing Module to present the synchronized object (so that the upstream participant can view, hear, or otherwise be presented the synchronized object) and to communicate the synchronized object with presentation instructions to the downstream participant communications device. Then the downstream participant communications device presents the synchronized object and, if there is another downstream participant communications device, then a communication to present the synchronized object with presentation instructions is communicated from the downstream participant communications device to the other downstream participant communications device. A synchronization acknowledgment is then received from the intermediate host communications device, and the synchronization acknowledgment identifies the participant communications devices and confirms a successful presentation of the object on the participant communications devices.

Other embodiments of this invention describe a system for conducting and/or managing a conference amongst an intermediate host and downstream participants. The system comprises an Intermediate Host Conferencing Module stored in a memory device, and a processor communicating with the memory device. Prior to the conference, the Intermediate Host Conferencing Module initializes conference participant communications devices to determine an intermediate host communications device and a downstream participant communications device, and then, communicates a library of digital objects and the Intermediate Host Conferencing Module to the intermediate host communications device. The library of digital objects and the Intermediate Host Conferencing Module are communicated to the intermediate host communications device via a communications network, such as, for example, a telecommunications network (e.g., Public Switched Telephone Network (PSTN)), a data communications network (e.g., an Internet Protocol (IP) communications network), and/or a satellite network. During the conference, a synchronization command communicates from the host communications device to the intermediate host communications device. The synchronization command instructs the Intermediate Host Conferencing Module of the intermediate host communications device to present a selected object from the library of digital objects and also instructs the intermediate host communications device to communicate the synchronization object with presentation instructions to the downstream participant communications device. Then, the synchronized object with presentation instructions is communicated to the downstream participant communications device. After the synchronized object is presented to the participant communications devices, a synchronization acknowledgment is communicated from the intermediate host communications device to the host, and the synchronization acknowledgment confirms a successful presentation of the object on the participant communications devices.

Other embodiments of this invention describe a computer program product. A computer-readable medium stores an Intermediate Host Conferencing Module. The Intermediate Host Conferencing Module initializes an intermediate host communications device and a downstream participant communications device, and, then, communicates a library of digital objects and the Intermediate Host Conferencing Module to the intermediate host communications device prior to a conference. The library of digital objects is communicated to the intermediate host communications device via a communications network, such as, for example, a telecommunications network (e.g., Public Switched Telephone Network (PSTN)), a data communications network (e.g., an Internet Protocol communications network), and/or a satellite network. During the conference a synchronization command communicates from the host communications device to the intermediate host communications device. The synchronization command instructs the Intermediate Host Communications Module of the upstream participant communications device to (1) present a selected object (also referred to as the "synchronized object") from the library of digital objects to the intermediate host communications device and (2) communicate the synchronized object with presentation instructions to the downstream participant communications device. If there is another downstream participant communications device communicating with the downstream participant communications device, then the Intermediate Host Communications Module of the upstream communications device also communicates the synchronized object with presentation instructions via the downstream participant communications device to the other downstream participant communications device. After the selected object is presented to the participant communications devices, a synchronization acknowledgment is communicated from the intermediate host communications device to the host, and the synchronization acknowledgment confirms a successful presentation of the object on the participant communications devices.

Other systems, methods, and/or computer program products according to embodiments will be or become apparent to one with skill in the art upon review of the following drawings and detailed description. It is intended that all such additional systems, methods, and/or computer program products be included within this description, be within the scope of this invention, and be protected by the accompanying claims.

BRIEF DESCRIPTION OF THE SEVERAL VIEWS OF THE DRAWINGS

These and other features, aspects, and advantages of the embodiments of this invention are better understood when the following Detailed Description of the Invention is read with reference to the accompanying drawings, wherein:

FIG. 11 is a flowchart illustrating an intermediate host conferencing, synchronization, and management method according to some of the exemplary embodiments of this invention.

DETAILED DESCRIPTION OF THE INVENTION

Figure 1:
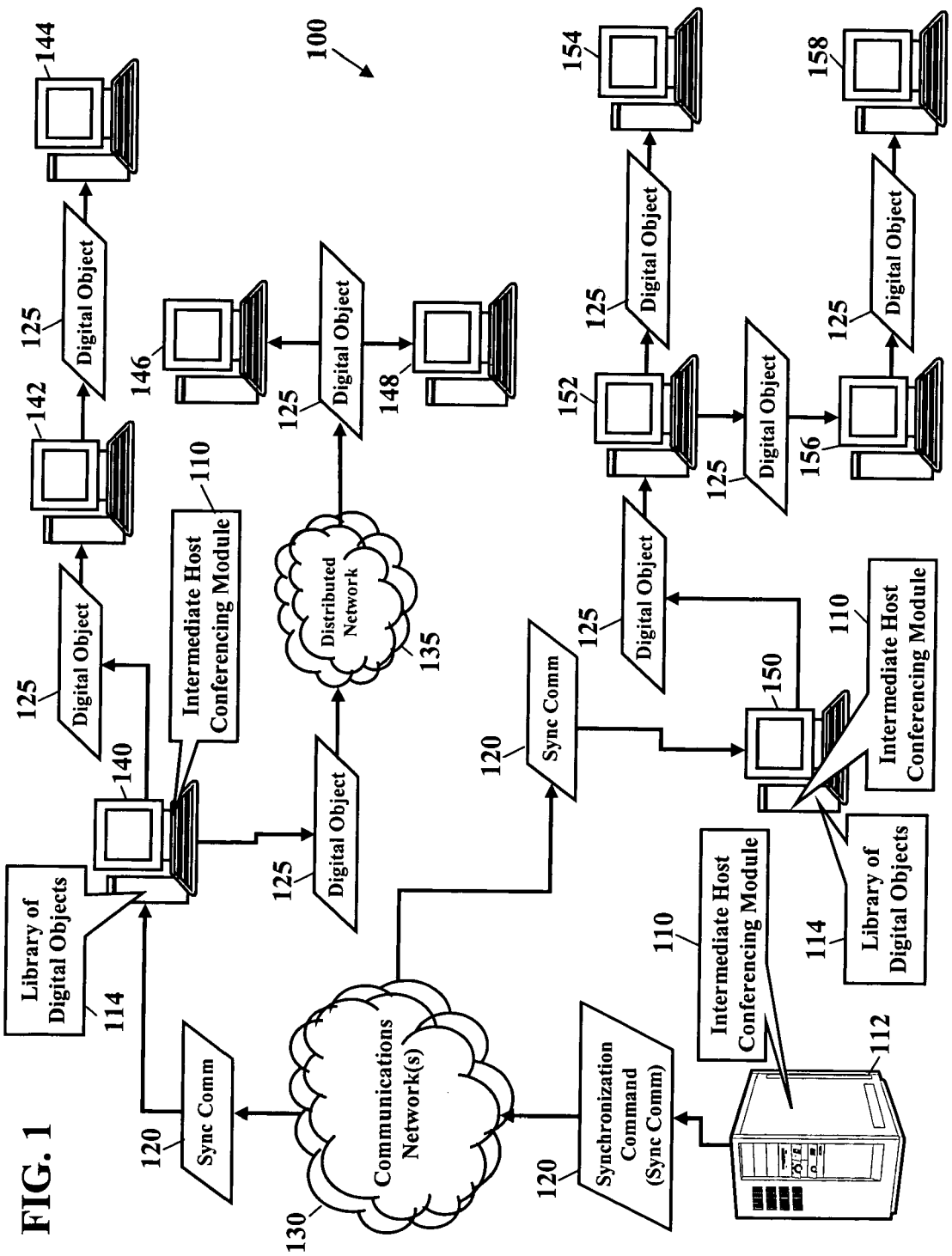
FIGS. 1-2 are schematics illustrating an intermediate host network for conferencing, synchronization, and management according to some of the exemplary embodiments of this invention.

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

This invention improves conferencing among remote participants. This invention does not require real-time streaming of presentation materials, so less bandwidth is required. This invention also includes features that help ensure all participants (i.e., upstream participants (also referred to as an "intermediate host") communicating with the host and/or server as well as downstream participants communicating either with the upstream participant or with another downstream participant) are synchronized to the host's presentation. As the conference host progresses through the presentation, this invention identifies to the intermediate host which downstream participants have viewed a current object (also referred to as the "synchronized object") of the presentation as well as which downstream participants are lagging behind and/or jumping ahead in the presentation materials. This invention can even prevent the intermediate host (and, consequently the host) from advancing in the presentation materials until all participants have viewed/heard/loaded the current object of the presentation. Furthermore, this invention includes additional features for the intermediate host to control conference management commands to a downstream participant, such as, for example, a command to exit the conference, to delaying present of the conference, to provide unrestricted access to the entire presentation, to provide authority to distribute presentation materials to a non-participant of the conference, to provide authority to modify the presentation materials, and to change a communications connection of the intermediate host network. This invention, then, allows the intermediate host to synchronize and control presentation materials to the downstream participant and to provide conference management commands and/or instructions to the downstream participant communications device. Thus, the intermediate host is able to more quickly respond to the downstream participant because the intermediate host can provide commands, respond to requests, and/or provide synchronized presentation materials without having to communicate with the host. And, thereby, the intermediate host is able to leverage communication assets among the intermediate host and the downstream participant(s). Consequently, the intermediate host can tailor the conference to better suit the downstream participant(s).

FIG. 1 is a schematic of an intermediate host network 100 illustrating some of the embodiments this invention. These embodiments include methods, systems, computer programs, and/or computer program products that manage a conferencing session amongst intermediate host participant communications devices. A host-resident Intermediate Host Conferencing Module 110 initially manages the conferencing session with an intermediate host communications device 140, 150 and at least one of a downstream participant downstream communications device 142, 144, 146, 148, 152, 154, 156, and/or 158. Although the Intermediate Host Conferencing Module 110 operates within any communications device, FIG. 1 shows the host-resident Intermediate Host Conferencing Module 110 operating within a host computer shown as a server 112. Prior to a scheduled date and time for the conference, a library 114 of digital objects and the Intermediate Host Conferencing Module 110 is communicated to the intermediate host participant communications device 140, 150. According to embodiments of this invention, the library 114 of digital objects and the Intermediate Host Conferencing Module 110 may be communicated from the server 112 to the intermediate host communications devices 140, 150 via a communications network 130, such as, for example, a telecommunications network (e.g., Public Switched Telephone Network (PSTN), Mobile Switching Telephone Office (MSTO), and others), a data network (e.g., an Internet (sometimes alternatively known as the "World Wide Web"), an intranet, a local-area network (LAN), and/or a wide-area network (WAN)), and/or a satellite network. Alternatively, the library 114 of digital objects and/or the Intermediate Host Conferencing Module 110 may be communicated/distributed via physical media, such as a CDROM, memory card, disk, and/or other memory storage device according to other embodiments of this invention. The library 114 of digital objects can be any audible and/or visual presentation materials. The library 114 of digital objects, for example, may include slides (such as MICROSOFT® POWERPOINT® file(s)), pictures, documents, audio, video, and/or any other computer file that can be stored on and/or presented to the participants communications devices 140, 142, 144, 146, 148, 150, 152, 154, 156, and 158 (MICROSOFT® and POWERPOINT® are registered trademarks of Microsoft Corporation, One Microsoft Way, Redmond Wash. 98052-6399, (425) 882-8080).

This invention reduces bandwidth requirements. This invention sends the presentation materials and the intermediate host conferencing module ahead of the scheduled date and time of the conference, and thus eliminates the often-cumbersome real-time distribution of presentation materials. Each intermediate host communications device 140, 150 locally stores the presentation materials. High bandwidth, therefore, is not required to participate in the conference. And, because each of the intermediate host manages the conference with associated downstream participants, communications with the host and the participants are streamlined to leverage communication assets of the intermediate host network 100. For example, each of the intermediate host communications devices 140, 150 stores the library 114 and controls distribution of the synchronized object to associated downstream participant communications devices (e.g., downstream participant communications devices 142, 144, 146, and 148 are associated with intermediate host communications device 140 and downstream participant communications devices 152, 154, 156, and 158 are associated with intermediate host communications device 150), and thus, minimizes storage requirements of the downstream participant communications devices 142, 144, 146, 148, 152, 154, 156, and 158, maximizes real-time transmission of the presentation materials to the downstream participant communications devices 142, 144, 146, 148, 152, 154, 156, and 158, and provides increased security by only communicating a synchronized object, and not the entire presentation. Still a further advantage of the intermediate host network 100 is to leverage the communications connections of a selected intermediate host communications device and associated downstream participant communications devices (e.g., intermediate host communications device 140 and associated downstream participant communications devices 142, 144, 146, and 148) so that these participant communications devices may be grouped together in a cascaded arrangement to uniformly manage synchronization (which may include different synchronized objects 125 than another grouping of a different intermediate host communications device and it's associated downstream participant communications devices) and provide other management flexibility, such as, for example, grouping together downstream participant communications devices to provide synchronization override instructions or another conference management command.

This invention leverages the communication assets of the intermediate host network 100 including communications paths between and/or among the host/server and participant communications devices and between and/or among each of the participant communications device. Prior to communicating the library 114 of digital objects and the intermediate host conferencing module 110, the host computer (e.g., server 112 of FIG. 1) transmits an initialization command to identify communication connections, if any, between at least two participant communications devices (e.g., participant communications devices 140, 142, 144, 146, 148, 150, 152, 154, 156, and/or 158 of FIG. 1) and to analyze transmission rates between the connected participant communications devices and between the host communications device and each of the participant communications devices to determine a list of one or more intermediate host communications devices (e.g., intermediate host communications devices 140, 150 of FIG. 1) and one or more downstream participant communications devices (e.g., downstream participant communications devices 142, 144, 146, 148, 152, 154, 156, and 158 of FIG. 1). One example of the initialization command is the "PING" command in the "Internet Control Message Protocol" (or "ICMP") protocol (an extension to the Internet Protocol (IP)) to test an Internet connection. Alternatively, the list may be created by an administrator, a user, (e.g., a host user or a participant user), by communications costs associated with each of the available communications paths connecting participant communications devices, and/or by other decision factors (e.g., reliability, security, ease of access, and so on). Regardless of how the list is determined, the host computer accesses the list for communication instructions from the host computer (e.g., server 112 of FIG. 1) to each of the intermediate host communications devices, for communication instructions for each of the intermediate host communications devices to the downstream communications devices, and for communications instructions for each of the downstream participant communications devices to other downstream participant communications devices (e.g., downstream participant communications device 142 communicates with another downstream participant communications device 144 ). The host computer communicates the list to the intermediate host communications device(s), and the intermediate host communications device may communicate the list to the downstream participant communications devices. After the library and the intermediate host conferencing module is communicated from the host computer to the intermediate host communications device, the host computer may also use the list to confirm local access of the library and an intermediate host-resident Intermediate Host Conferencing Module from the intermediate host communications device, and, if desired, verify an available communications path from the intermediate host communications device with the downstream participant communications device. An exemplary list of the intermediate host network 100 communications paths is illustrated below in Table 1.

TABLE 1

Intermediate Host Network Communications Paths of FIG. 1

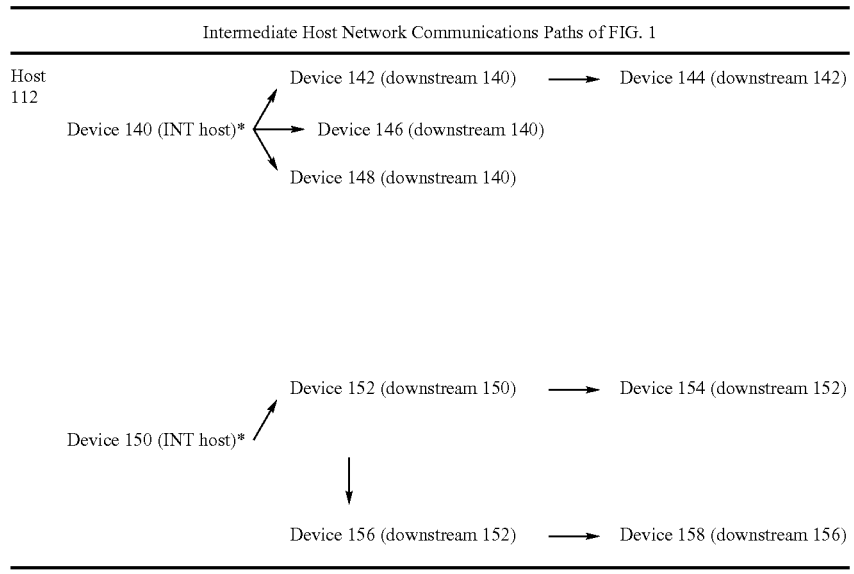

*INT host represents an intermediate host participant communications device

The intermediate host network 100 communicates a message from the host computer to an intermediate host communications device, then from the intermediate host communications device to an associated downstream participant communications device, and then from the downstream participants communications device to another associated downstream participant communications device. For example, the library 114 and the Intermediate Host Conferencing Module 110 may be communicated from the server 112 to each intermediate host communications device 140, 150 prior to the conference. During the conference, synchronized objects are communicated and presented via the intermediate host network 100. As the conference progresses, the host-resident Intermediate Host Conferencing Module 110 communicates a synchronization command (also referred to as "Sync Confirm) 120 from the server 112 to each intermediate host communications device 140, 150. Then, the intermediate host-resident Intermediate Host Conferencing Module 110 receives the synchronization command 120 and instructs the intermediate host communications device 140, 150 (1) to communicate the synchronized object 125 and presentation instructions within the intermediate host network 100 (e.g., intermediate host communications device 140 communicates the synchronized object 125 with presentation instruction to associated downstream participant communications devices 142, 146, and 148, and downstream participant communications device 142 communicates the synchronized object 125 with presentation instructions to further associated downstream participant communications device 144) and (2) to visually and/or audibly present (e.g., the presentation instructions) the synchronized object 125 from the library 114 of digital objects to the intermediate host communications device 140, 150. Thereafter, the synchronized object 125 is visually and/or audibly presented to each of the downstream communications devices. That is, for example, as the intermediate host communications device 140, 150 switches from one synchronized object 125 to another synchronized object in the library 114 of digital objects, each of the intermediate host participant communications devices 140, 150 presents the synchronized object 125 and/or communicates the synchronized object 125 with presentation instructions to an associated downstream participant communications device so that all of the participants "follow along" and synchronize with the intermediate host communications device 140, 150. The intermediate host communications device 140, 150 may switch from one synchronized object 125 to another synchronized object in the library 114 when either (1) it receives the synchronization command 120 from the host server 112 shown in FIG. 1 or (2) the host server 112 enables a synchronization override command to the intermediate host communications device 140, 150 such that the intermediate host communications device 140, 150 autonomously manages communications and selection of the synchronized object 125 during the conference.

Figure 2:
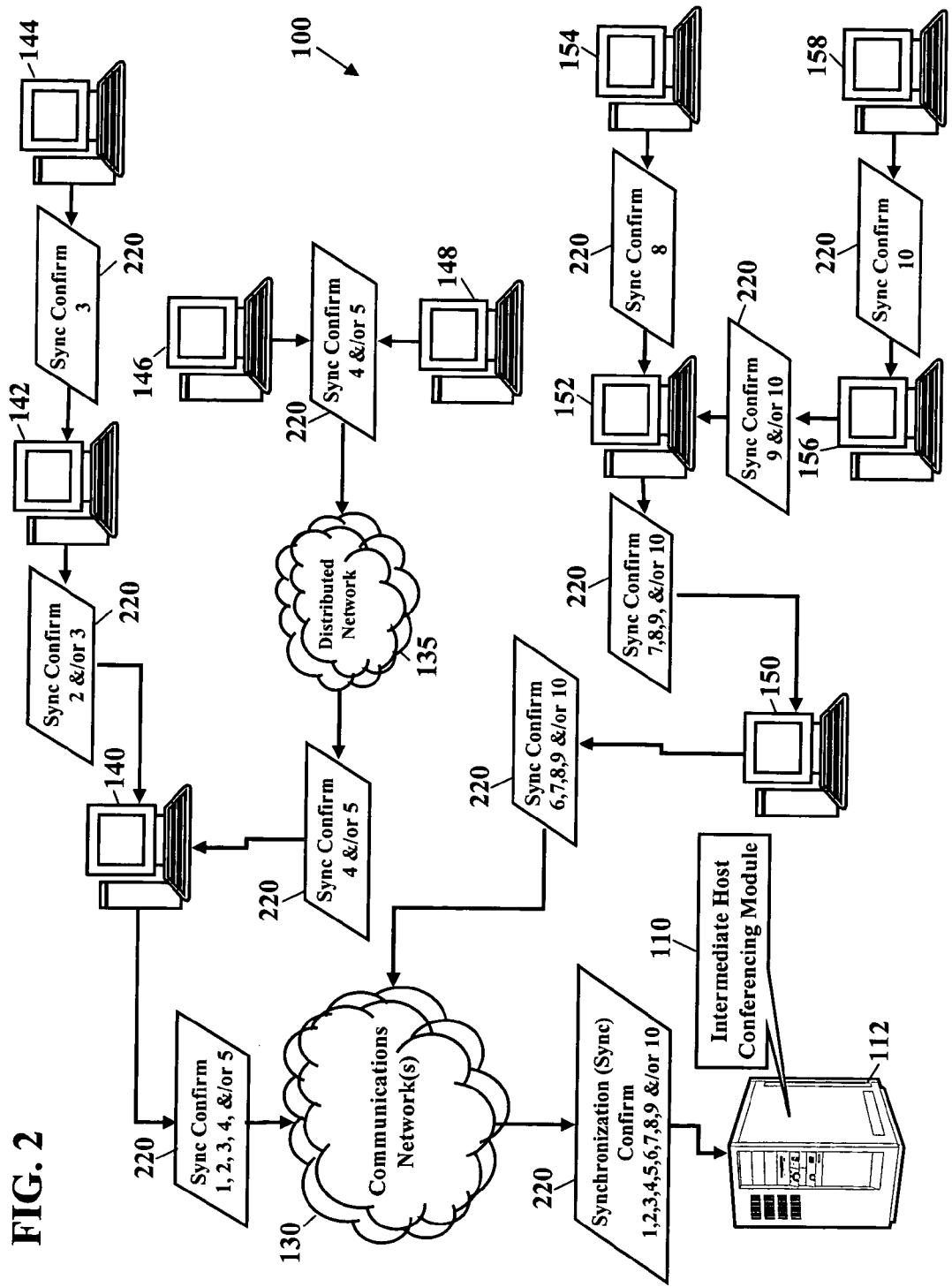

FIG. 2 is a schematic illustrating more of the embodiments of this invention. After the synchronization command (shown as reference numeral 120 in FIG. 1) is communicated within the intermediate host network 100, the participant communications devices 140, 142, 144, 146, 148, 150, 152, 154, 156, and 158 may also acknowledge synchronization. According to an exemplary embodiment, when the downstream participant communications device (e.g., downstream participant communications device 144 or downstream participant communications device 158) successfully presents the synchronized object 125, then that downstream participant communications device communicates a synchronization confirmation (also referred to as "Sync Confirm) 220 up the intermediate host network 100 of participant communications devices so that the intermediate host communications devices 140, 150 may then communicate the synchronization confirmation 220 back to the server 112 (and to the host). An exemplary list for the synchronization confirmation 220 communications paths of the intermediate host network 100 is shown below in Table 2.

TABLE 2

Intermediate Host Network Communications Paths of FIG. 2

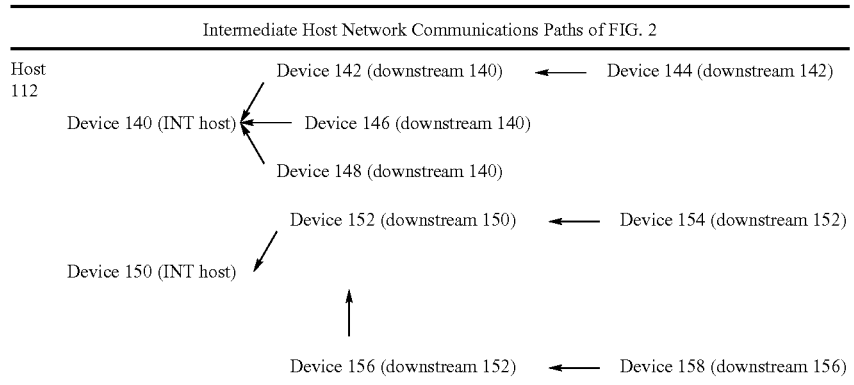

The intermediate host communications devices 140, 150 communicate the synchronization confirmation 220 via the communications network 130 to the server 112. The synchronization confirmation 220 acknowledges the successful presentation of the synchronized object on each of the participant communications devices 140, 142, 144, 146, 148, 150, 152, 154, 156, and 158. Alternatively, the synchronization confirmation 220 may also report a failed presentation of the synchronized object 125 to one or more of the participant communications device 140, 142, 144, 146, 148, 150, 152, 154, 156, and/or 158 as well as acknowledge the successful presentation of the synchronized object to other participant communications devices sharing the same communications path(s). For example, the synchronization confirmation 220 from intermediate host communications device 150 may acknowledge successful presentation of the synchronized object 125 to participant communications device 150, 152, 156, and 158 as well as report a failed presentation of the synchronized object 125 to downstream participant communications device 154.

The synchronization confirmation 220 provides several advantages. The synchronization confirmation 220 may help to ensure and/or to provide helpful information that all participants are synchronized before the host and/or intermediate host advances to the next object in the library 114 of digital objects. The intermediate host-resident Intermediate Host Conferencing Module 110, for example, may use the synchronization confirmation 220 to force intermediate host communications device 140 and/or 150 to delay communication of any subsequent synchronized objects 125. The intermediate host then may choose to wait until each associated downstream participant communications device return communicates the synchronization confirmation 220. For example, the intermediate host may choose to not jump to another object in the library 114 until all associated downstream participant communications devices have successfully presented the synchronized object 125. The Intermediate Host Conferencing Module 110 can even visually and/or audibly inform the intermediate host of the downstream participant communications devices that are synchronized and of which participants are not synchronized. Alternatively, the intermediate host-resident Intermediate Host Conferencing Module 110 may use the synchronization confirmation 220 to force the server 112, and thus the host, to delay communication of any subsequent synchronization commands 120 to the intermediate host communications device 140, 150.

In further exemplary embodiments, the synchronization confirmation 220 may include additional information, such as a request from one (or more) of the downstream participant communications devices to an associated intermediate host (e.g., downstream participant communications devices 142, 144, 146, and/or 148 associated with intermediate host communications device 140). For example, downstream participant communications device 148 may communicate the synchronization confirmation 220 with a request to exit the conference. This request is communicated with the synchronization confirmation 220 to intermediate host communications device 140 such that the intermediate host-resident Intermediate Host Conferencing Module 110 can identify the downstream participant communications device 148 request to exit the conference and can immediately provide a command to respond to the request and modify future communications accordingly (e.g., if downstream participant communications device 148 exits the conference, then intermediate host communications device 140 will terminate communication of a subsequent synchronized object 125 to downstream participant communications device 148). Alternatively, when the intermediate host-resident Intermediate Host Conferencing Module 110 communicates the next synchronized object 125, that next, subsequent synchronized object 125 may include commands and/or instructions that enable the downstream communications device 148 to exit the conference and that terminate subsequent synchronized objects 125 to downstream communications device 148. Furthermore, if communications are terminated to a downstream participant communications device that provides a communications path to other downstream participant communications devices (e.g., intermediate host communications device 140 provides a communications path to downstream participant communications device 142 that provides a communications path to downstream communications device 144), then the intermediate host network may need to be reconfigured so that an alternate communications path is available to participating downstream participant communications devices. For example, if communications of subsequent synchronized objects 125 were terminated to downstream participant communications device 142, then the communications path of intermediate host communications device 140 may need to be updated to provide a communications path to downstream communications device 144 so that downstream communications device 144 receives subsequent synchronized objects 125 (since downstream participant communications device 142 is no longer participating in the conference).

In further exemplary embodiment, the synchronization confirmation 220 may include other requests from a downstream participant including a request to delay presentment of the synchronized object, a request to access to a non-synchronized digital object, a request for authority to distribute the object to a non-participant of the conference, a request for authority to modify the object, and a request to terminate further communication of the synchronization confirmation. In response to the synchronization confirmation, a subsequent synchronized object 125 may provide commands and/or instructions that enable the request of the downstream participant, such as commands and/or instructions to delay presentment of the synchronized object, to access to any object from the library of digital objects, to distribute the object to the non-participant, to modify the object, and/or to terminate further communication of the synchronized object.

According to some of the embodiments, the intermediate host-resident Intermediate Host Conferencing Module 110

Figure 3:
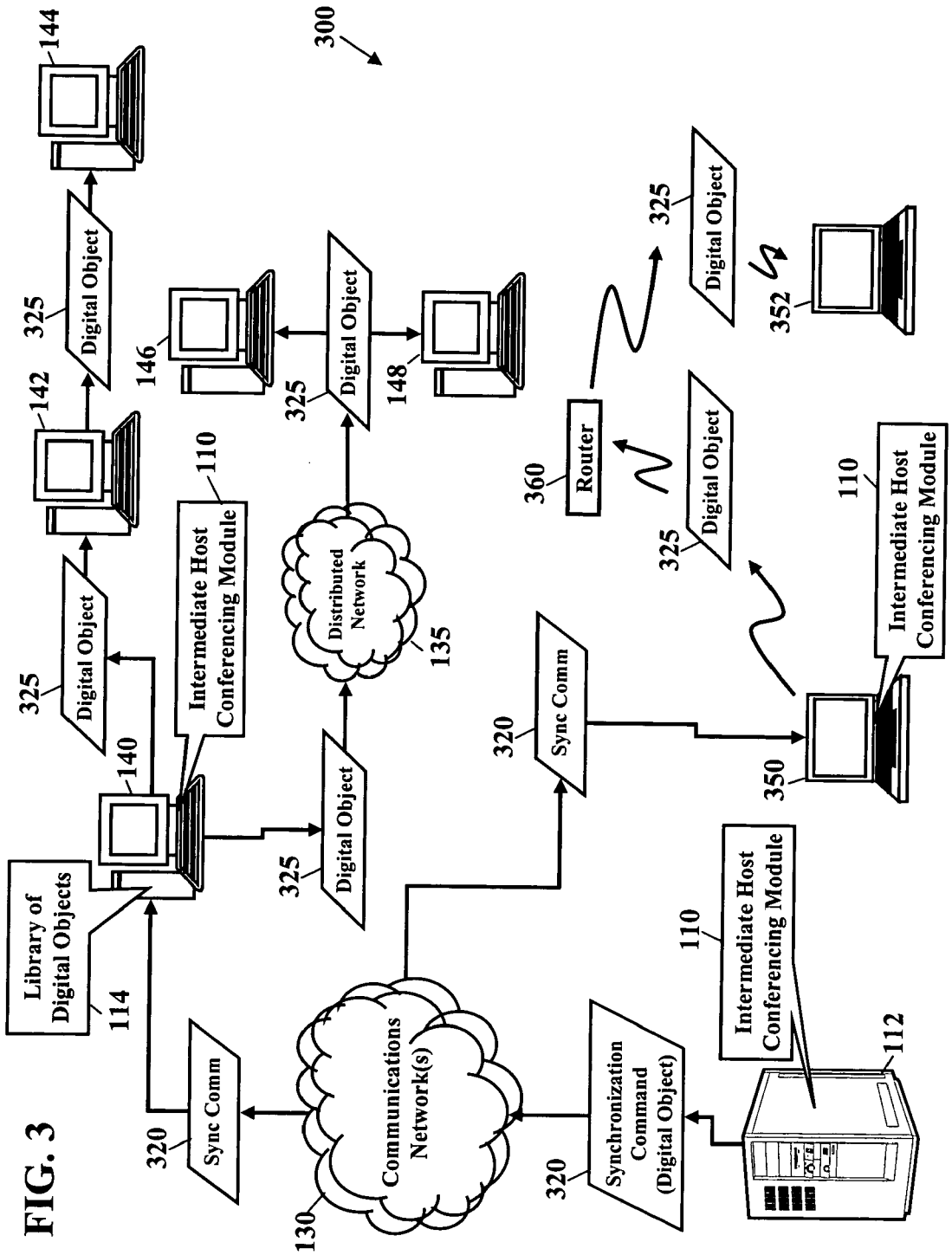
FIGS. 3-4 are schematics illustrating another intermediate host network for conferencing, synchronization, and management according to some of the exemplary embodiments of this invention.
Figure 4:
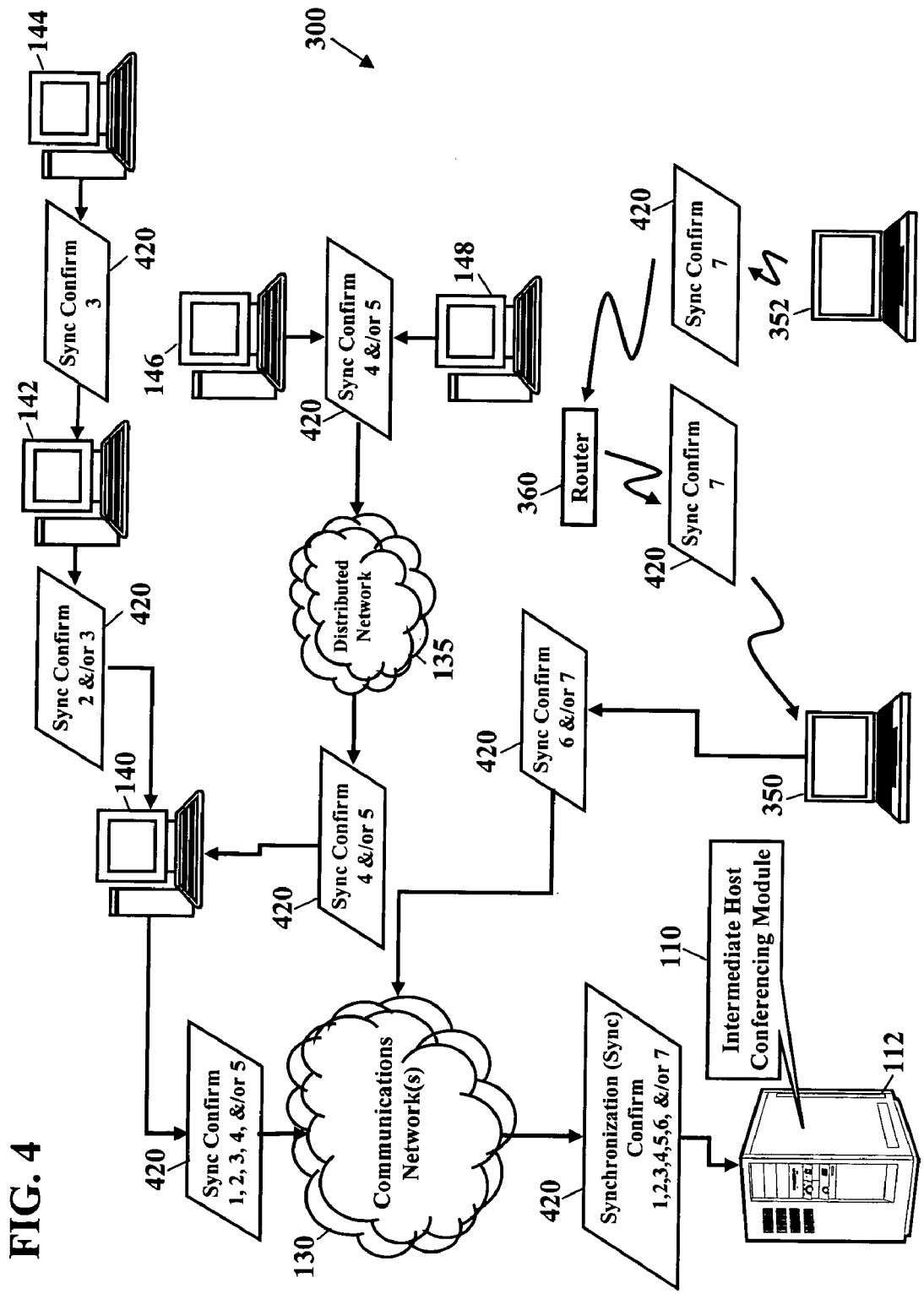

FIGS. 3 and 4 illustrate an intermediate host network 300 similar to the intermediate host network 100 of FIG. 1; however, the intermediate host network 300 includes an intermediate host communications device 350 in communication with a wireless downstream participant communications device 352 via a router 360. The intermediate host-resident Intermediate Host Conferencing Module 110 manages the conferencing session between the intermediate host communications device and the associated downstream participant communications device(s). Similar to the above described embodiments, the intermediate host network 300 may be initialized so that a list of upstream and downstream participant communications devices are determined. An exemplary list of the intermediate host network 300 communications paths of FIG. 3 is illustrated below in Table 3.

TABLE 3

Intermediate Host Network Communications Paths of FIG. 3

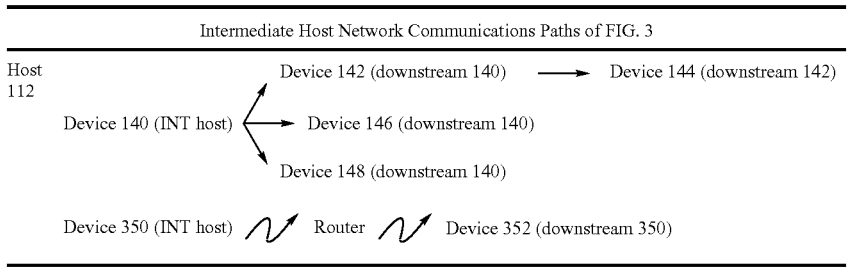

can also ignore the synchronization confirmation 220. The synchronization confirmation 220, as explained above, provides a tool that may help ensure that all associated downstream participants are synchronized with an associated intermediate host (and, ultimately, with the host) before the intermediate host advances to the next object in the library of digital objects. The intermediate host-resident Intermediate Host Conferencing Module 110, however, can also be configured (prior to or during the conference) to ignore receipt of one or more synchronization confirmations 220. That is, the Intermediate Host Conferencing Module 110 may allow the intermediate host communications device to advance to a subsequent object in the library 114 without first receiving the synchronization confirmation 220 from one or more selected downstream participant communications devices. This feature may also allow the selected downstream participant(s) to request any object in the library 114 such that they can "jump" ahead, or lag behind, and view/hear any object. For example, the intermediate host-resident Intermediate Host Conferencing Module 110 might determine that some associated downstream participants need not be synchronized. If, for example, the conference is a training session, some portions of the training session might already be known to some participants, so these participants are selected and are not required to synchronize. Other criteria for selecting a participant may be to select a downstream participant communications device with an unreliable and/or slow communications path. However the participant is selected, the Intermediate Host Conferencing Module 110 can be configured to ignore receipt of the synchronization confirmation 220 from these selected participants. Thus, the intermediate host-resident Intermediate Host Conferencing Module 110 may be configured to permit the intermediate host communications device to advance/return to any object in the library 114 without first receiving the synchronization confirmation 220 from the selected participant communications device.

After the intermediate host communications device and the downstream participant communications devices are determined, the library of digital objects and the Intermediate Host Conferencing Module are communicated to the intermediate host communications device. That is, the library 114 of digital objects and the Intermediate Host Conferencing Module 110 are communicated from the server 112 to the intermediate host communications devices 140, 350 via the communications network 130. Each intermediate host communications device 140, 350 then, locally stores the library 114 and the Intermediate Host Conferencing Module 110.

During the conference, synchronization commands are issued via the intermediate host network 300. As the conference progresses, the host-resident Intermediate Host Conferencing Module 110 communicates a synchronization command 320 (similar to synchronization command 120) from the server 112 to each intermediate host communications device 140, 350. The intermediate host-resident Intermediate Host Conferencing Module 110 receives the synchronization command 320 and instructs each of the intermediate host communications devices 140, 150 (1) to communicate a synchronized object 325 and presentation instructions within the intermediate host network 300 (e.g., intermediate host communications device 350 communicates the synchronized object 325 with presentation instruction to associated downstream participant communications device 352 via router 360) and (2) to visually and/or audibly present (e.g., the presentation instructions) the synchronized object 325 from the library 114 of digital objects to each of the intermediate host communications devices 140, 350. Thereafter, the synchronized object 325 is visually and/or audibly presented to each of the downstream communications devices. That is, for example, as the intermediate host communications device 140, 350 switches from one synchronized object 325 to another synchronized object in the library 114 of digital objects, each of the intermediate host participant communications devices 140, 350 presents the synchronized object 325 and/or communicates the synchronized object 325 with presentation instructions to an associated downstream participant communications device so that all of the participants "follow along" and synchronize with the intermediate host communications device 140, 350. The intermediate host communications device 140, 350 may switch from one synchronized object 325 to another synchronized object in the library 114 when either (1) it receives the synchronization command 120 from the host server 112 shown in FIG. 1 or (2) the host server 112 enables a synchronization override command to the intermediate host communications device 140, 350 so that the intermediate host communications device 140, 350 autonomously manages communications and selection of the synchronized object 325 during the conference.

After the synchronized object 325 is communicated within and presented to the intermediate host network 300, the participant communications device 140, 142, 144, 146, 148, 350, and 352 may also acknowledge synchronization. When a downstream participant communications device (e.g., downstream participant communications device 144 or downstream wireless participant communications device 352) successfully presents the synchronized object 325, then that downstream participant communications device communicates a synchronization confirmation (also referred to as "Sync Confirm) 420 up the intermediate host network 300 of participant communications devices so that the intermediate host communications devices 140, 350 may then communicate the synchronization confirmation 420 back to the server 112 (and to the host). An exemplary list for the synchronization confirmation 420 communications paths of the intermediate host network 300 is shown below in Table 4.

of instructions that control the internal functions of the computer system 500. A system bus 550 communicates signals, such as data signals, control signals, and address signals, between the central processor 548 and a system controller 552 (typically called a "Northbridge"). According to some of the embodiments of this invention, these signals include synchronization commands, synchronized objects, and/or synchronization confirmations shown as reference numerals 120, 125, 220, 320, 325, 420, 620, 625, 720, 920, 925, and 1020 of respective FIGS. 1-4, 6-7, and 9-10. The system controller 552 provides a bridging function between the one or more central processors 548, a graphics subsystem 554, the memory subsystem 542, and a PCI (Peripheral Controller Interface) bus 556. The PCI bus 556 is controlled by a Peripheral Bus Controller 558. The Peripheral Bus Controller 558 (typically called a "Southbridge") is an integrated circuit that serves as an input/output hub for various peripheral ports. These peripheral ports are shown including a keyboard port 560, a mouse port 562, a serial port 564 and/or a parallel port 566 for a video display unit, one or more external device ports 568, and networking ports 570 (such as SCSI or Ethernet). The Peripheral Bus Controller 558 also includes an audio subsystem 572. Those of ordinary skill in the art understand that the program, processes, methods, and systems described in this patent are not limited to any particular computer system or computer hardware. Other architectures are possible, and the Intermediate Host Conferencing Module 110 can operate in any architecture.

Those of ordinary skill in the art also understand the central processor 548 is typically a microprocessor. Advanced Micro Devices, Inc., for example, manufactures a full line of ATHLON™ microprocessors (ATHLON™ is a trademark of

TABLE 4

Intermediate Host Network Communications Paths of FIG. 4

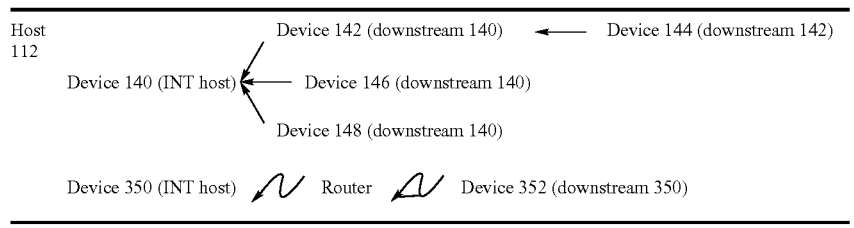

Similar to the above described embodiments, the synchronization confirmation 420 acknowledges the successful presentation (or a failed presentation or a request) of the synchronized object on each of the participant communications devices 140, 142, 144, 146, 148, 350, and 352.

Figure 5:
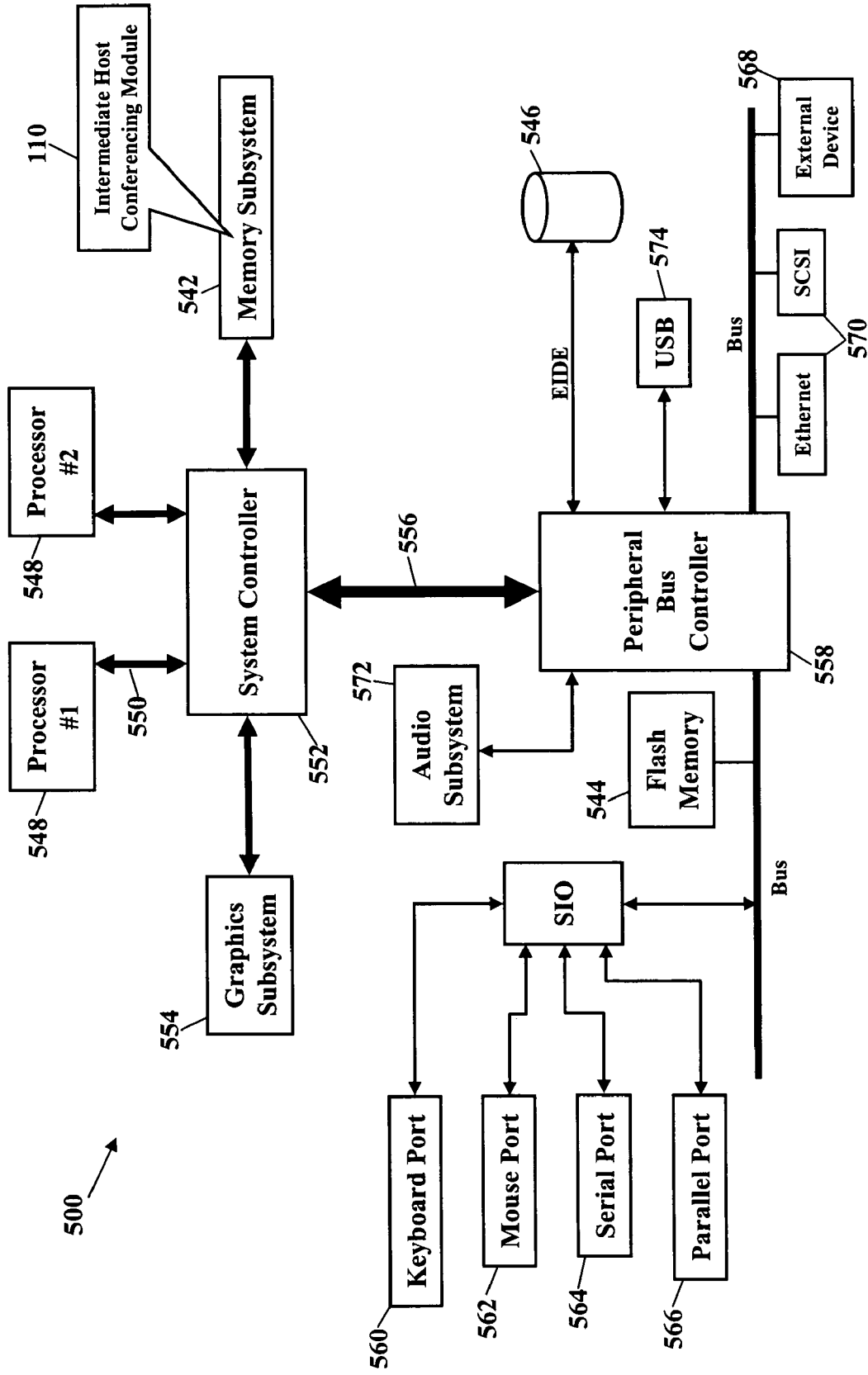
FIG. 5 illustrates a block diagram of an operating system according to some of the exemplary embodiments of this invention.

FIG. 5 illustrates a block diagram showing the Intermediate Host Conferencing Module 110 residing in a computer system 500. The computer system 500 may be any computing system, such as the server (shown as reference numeral 112 in FIGS. 1-4), a laptop/desktop computer, a tablet computer, and/or other computer systems including wired and wireless communications devices. As FIG. 5 shows, the Intermediate Host Conferencing Module 110 operates within a system memory device. The Intermediate Host Conferencing Module 110, for example, is shown residing in a memory subsystem 542. The Intermediate Host Conferencing Module 110, however, could also reside in flash memory 544 or a peripheral storage device 546. The computer system 500 also has one or more central processors 548 executing an operating system. The operating system, as is well known, has a set Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), Sun Microsystems, Inc. (4150 Network Circle, Santa Clara Calif. 95054, www.sun.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The preferred operating system is the UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, www.redhat.com). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080, www.Microsoft.com). and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 542, flash memory 544, or peripheral storage device 546) may also contain an application program. The application program cooperates with the operating system and with a video display unit (via the serial port 564 and/or the parallel port 566) to provide a Graphical User Interface (GUI). The Graphical User Interface typically includes a combination of signals communicated along the keyboard port 560 and the mouse port 562. The Graphical User Interface provides a convenient visual and/or audible interface of the Intermediate Host Conferencing Module 110 with a user of the computer system 500.

Figure 6:
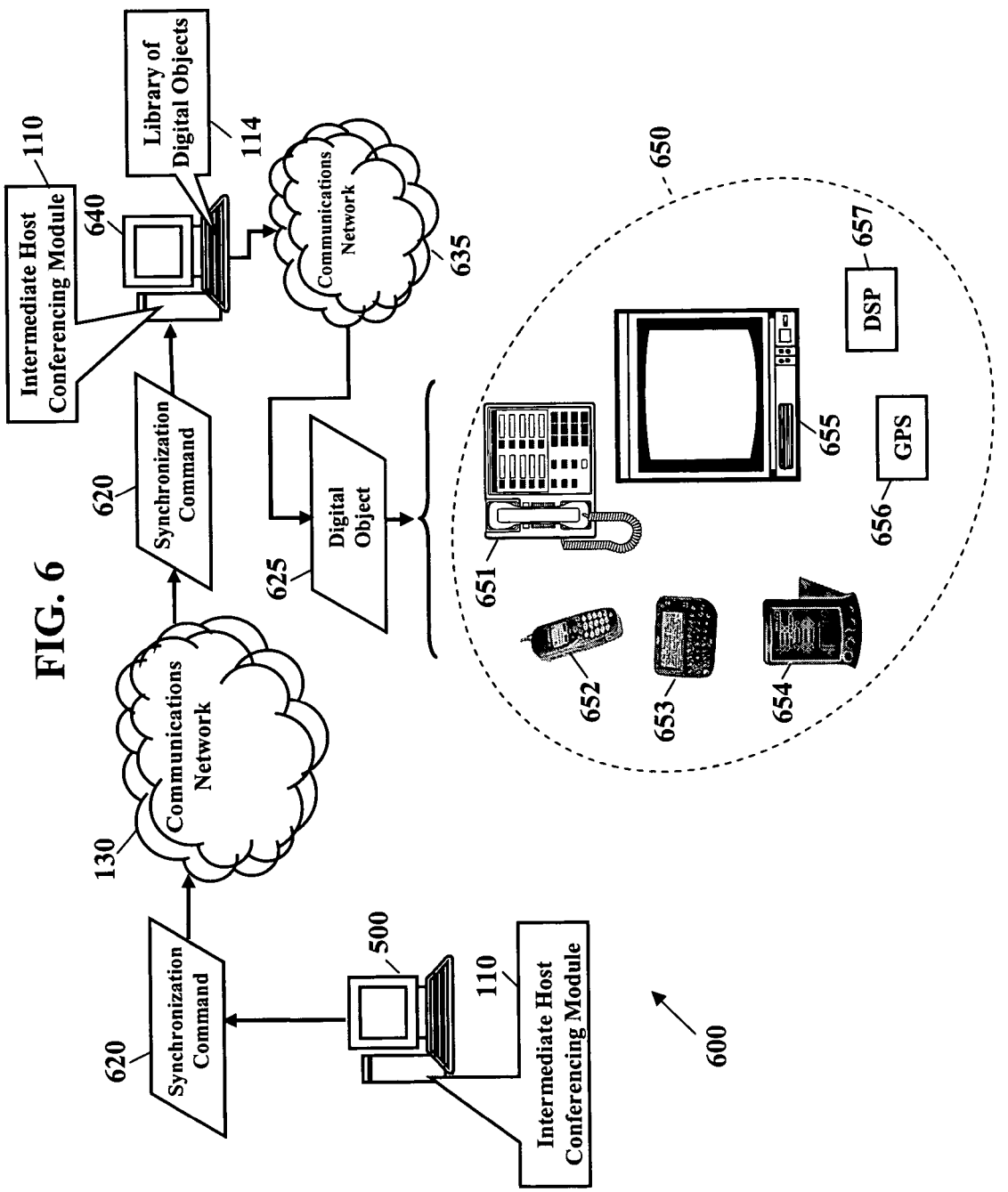
FIGS. 6-7 are schematics depicting a further intermediate host network for conferencing, synchronization, and management according to some of the exemplary embodiments of this invention.
Figure 7:
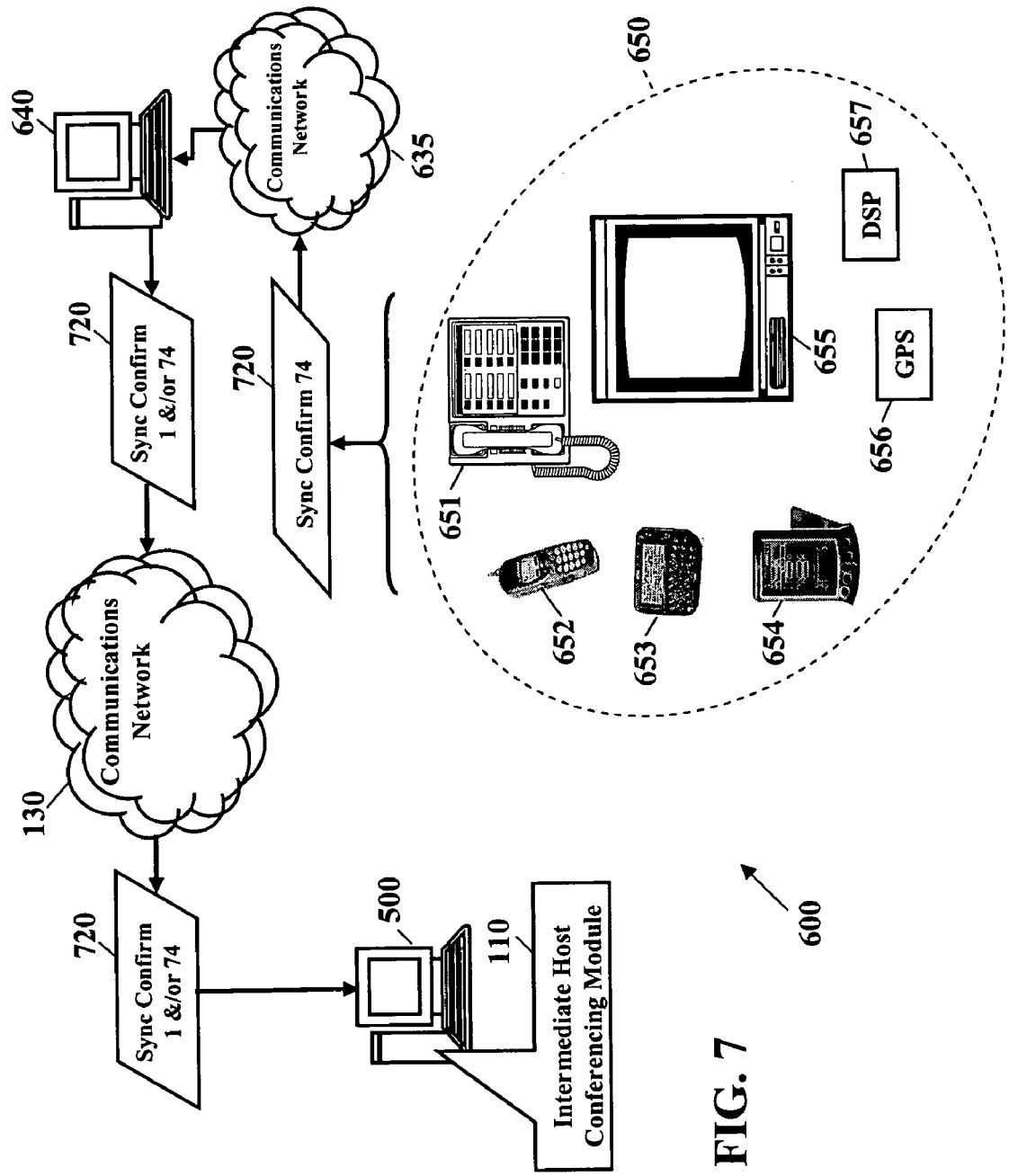

FIGS. 6 and 7 illustrate an intermediate host network 600 that includes the personal computer 500 hosting an intermediate host conference over communications network 130 with an intermediate participant communications device 640 in communication over a communications network 635 with one or more alternate downstream communications devices 650 that operate with this invention. According to some embodiments, intermediate participant communications device 640 may have components similar and/or identical to the personal computer 500. FIGS. 6 and 7 illustrate one or more alternate downstream participant communications device 650 that may include an Internet Protocol (IP) phone 651, a cellular/satellite phone 652, a pager 653, a personal digital assistant (PDA) 654, a Global Positioning System (GPS) device 656, an interactive television 657, or any computer and/or communications device utilizing the digital signal processor (DSP) 658. The alternate downstream participant communications device 650 may also include addressable watches, radios, vehicle electronics, clocks, printers, gateways, and other apparatuses and systems. The intermediate host communications device 640 communicates with alternate downstream participant communications device 650 via the communications network 635. The communications network 635 may include a telecommunications network (e.g., Public Switched Telephone Network (PSTN), Mobile Switching Telephone Office (MSTO), and others), a data network (e.g., an Internet (sometimes alternatively known as the "World Wide Web"), an intranet, a local-area network (LAN), and/or a wide-area network (WAN)), and/or a satellite network that establishes the communications path(s) among the participants.

FIGS. 6 and 7 further illustrate the communications paths of a synchronization command 620 from the personal computer 500 to intermediate host communications device 640. The intermediate host-resident Intermediate Host Conferencing Module 110 receives the synchronization command 620, instructs the intermediate host communications device 640 to present the synchronized object 625 and to communicate the synchronized object 625 with presentation instructions to downstream participant communications device 650, and communicates a synchronization confirmation 720 of the intermediate host network 600 to acknowledge a successful presentation of the synchronized object.

Figure 8:
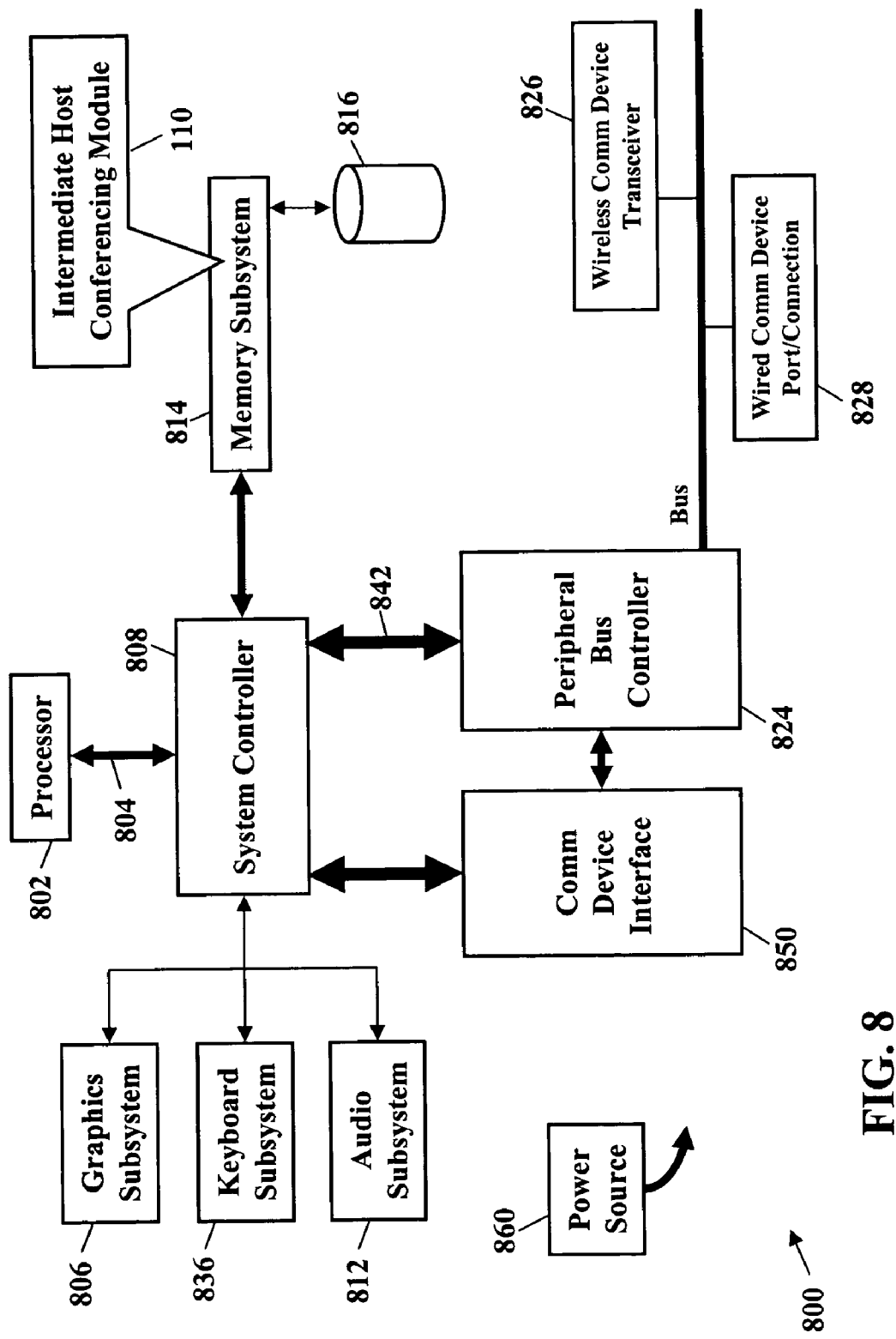
FIG. 8 illustrates another block diagram of an operating system according to some of the exemplary embodiments of this invention.

FIG. 8 illustrates another block diagram showing the Intermediate Host Conferencing Module 110 residing in an alternate voice/data communications device 800. As FIG. 1 shows, the Intermediate Host Conferencing Module 110 operates within a system memory device. The Intermediate Host Conferencing Module 110, for example, is shown residing in a memory subsystem 814. The Intermediate Host Conferencing Module 110, however, could also reside in flash memory 826 or a peripheral storage device 816. The voice/data communications device 800 also has one or more central processors 802 executing an operating system. The operating system, as is well known in the art, has a set of instructions that control the internal functions of the voice/data communications device 800. A communications interface 804 communicates signals, such as data signals, control signals, and address signals, between the central processor 802 and a system controller 808 (typically called a "Northbridge"). According to some of the embodiments of this invention, these signals include synchronization command 920 of FIG. 9 and synchronization confirmation 1020 of FIG. 10. Additionally, the communications interface 804 has a means to communicate a communications signal between the voice/data communications device 800 and a communications network (such as 130 of FIGS. 1-10).

The system controller 808 provides a bridging function between the one or more central processors 802, a graphics subsystem 806, a keyboard subsystem 836, an audio subsystem 812, the memory subsystem 814, a PCI (Peripheral Controller Interface) bus 842, and a Communications ("Comm") Device Interface 850. The PCI bus 842 is controlled by a Peripheral Bus Controller 824. The Peripheral Bus Controller 824 (typically called a "Southbridge") is an integrated circuit that serves as an input/output hub for various peripheral ports and/or transceivers. These peripheral ports allow the voice/data communications device 800 to communicate with a variety of devices through networking ports (such as SCSI or Ethernet) and/or transceivers that include Wireless Communications ("Comm") Device Transceiver 826 (for communication of any frequency signal in the electromagnetic spectrum, such as, for example, Wireless 802.11 and Infrared) and Wired Communications ("Comm") Device Port/Connection 828 (such as modem V90+ and compact flash slots). These peripheral ports could also include other networking ports, such as, a serial port (not shown) and/or a parallel port (not shown). The Comm Device Interface 850 allows the voice/data communications device 800 to monitor, detect, receive, and decode incoming (and outgoing) communications signals to the communications device(s) connected to the Wireless Comm Device Transceiver 826 and/or the Wired Comm Device Port/Connection 828. Further, the Comm Device Interface 850 may transmit the communications signal to the Wireless Comm Device Transceiver 826 and/or the Wired Comm Device Port/Connection 828. Still further, the voice/data communications device 800 may include a power source 860, such as a rechargeable battery to provide power and allow the voice/data communications device 800 to be portable. Additionally, those of ordinary skill in the art understand that the program, processes, methods, and systems described in this patent are not limited to any particular computer system or computer hardware.

Figure 9:
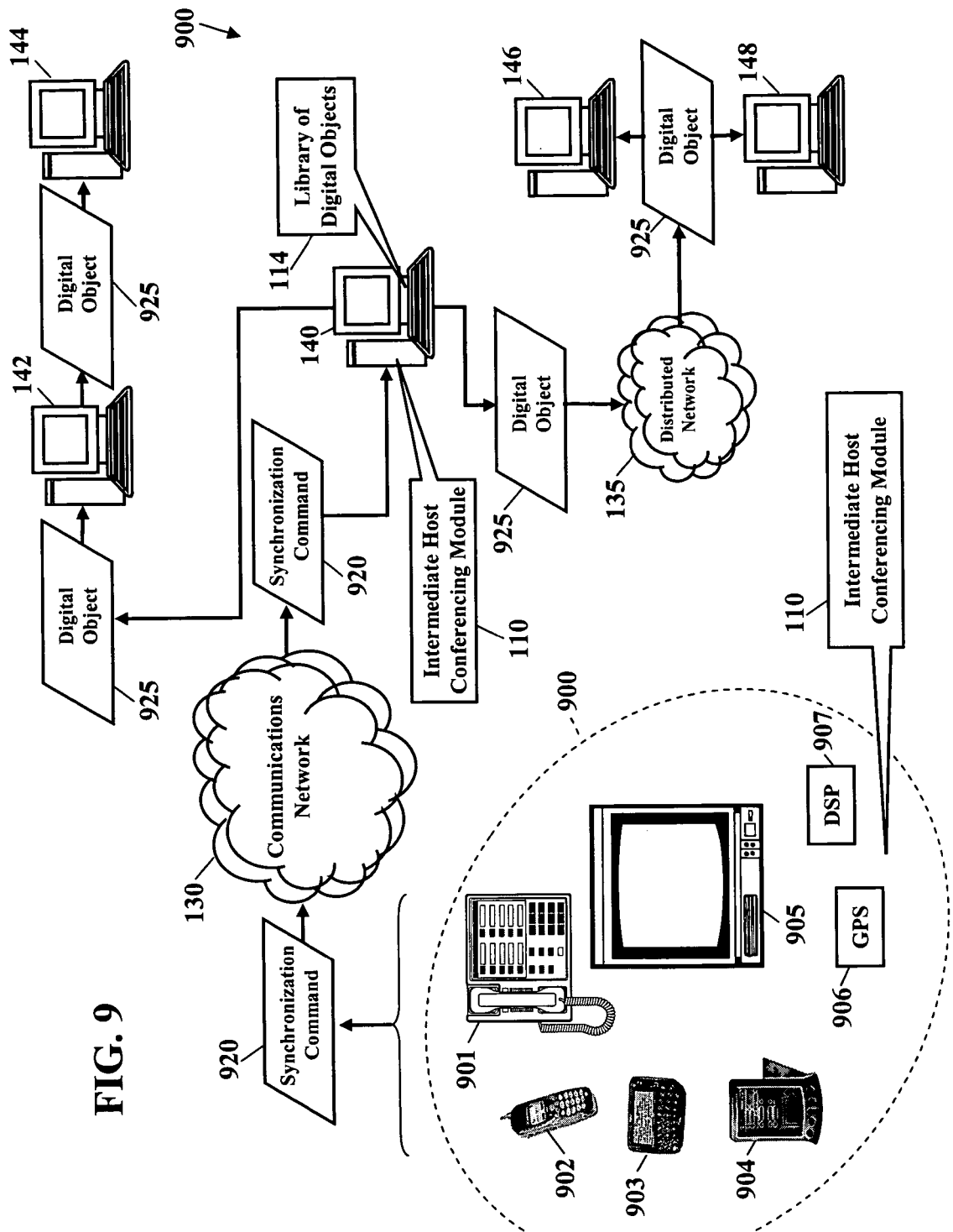
FIGS. 9-10 are schematics depicting still a further intermediate host network for conferencing, synchronization, and management according to some of the exemplary embodiments of this invention.
Figure 10:
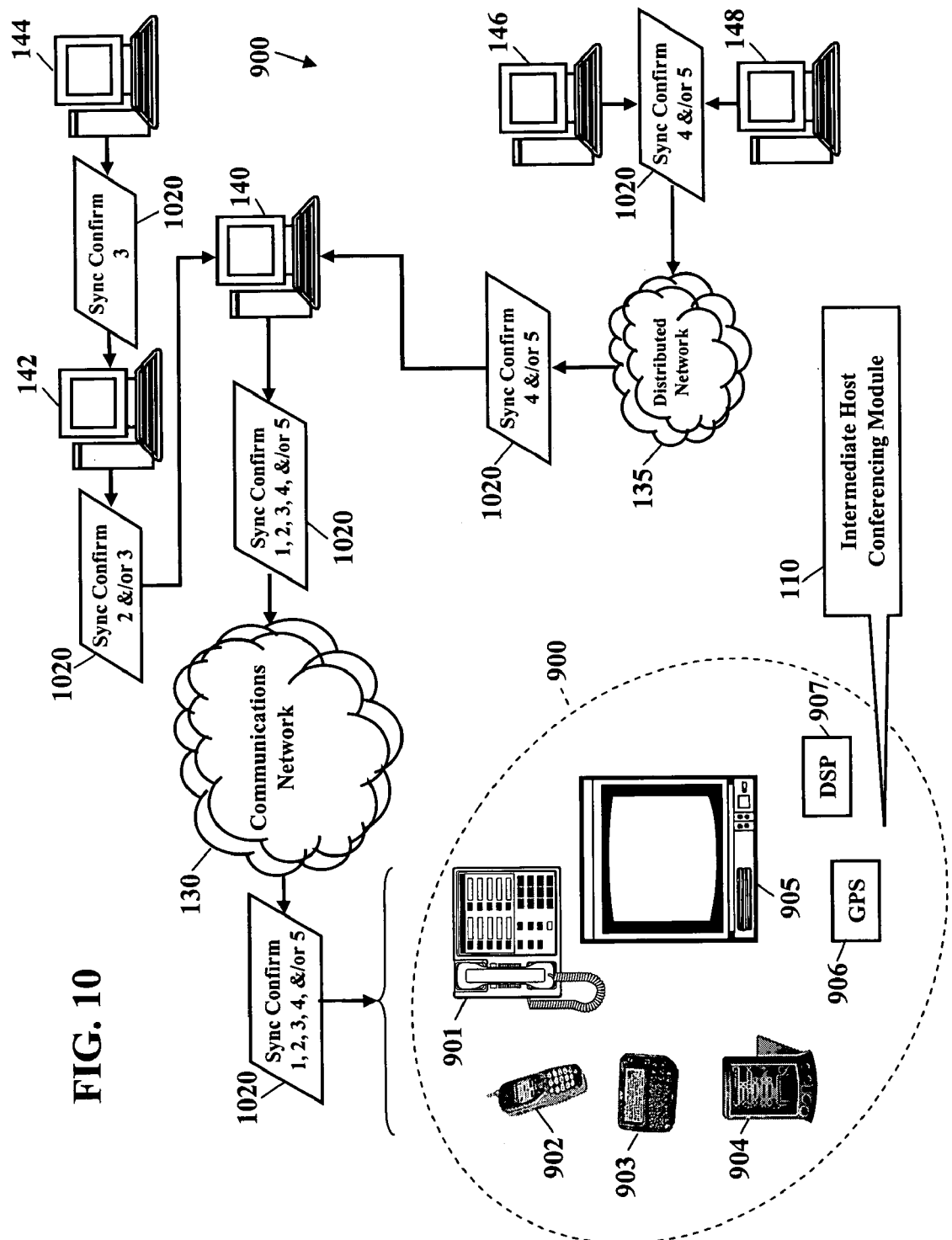

FIGS. 9 and 10 illustrate an intermediate host network 900 that includes one or more alternate voice/data communications devices 800 hosting an intermediate host conference over communications network 130 with the intermediate host communications device 140 in communication with downstream participant communications devices 142, 144, 146, and 148 that operate with this invention. FIGS. 9 and 10 illustrate one or more alternate voice/data communications devices 800 that may include an Internet Protocol (IP) phone 901, a cellular/satellite phone 902, a pager 903, a personal digital assistant (PDA) 904, an interactive television 905, a Global Positioning System (GPS) device 906, or any computer and/or communications device utilizing the digital signal processor (DSP) 907. The alternate voice/data communications devices 800 may also include addressable watches, radios, vehicle electronics, clocks, printers, gateways, and other apparatuses and systems. The alternate voice/data communications devices 800 communicate with intermediate host communications device 140 via the communications network 130 which may include a telecommunications network (e.g., Public Switched Telephone Network (PSTN), Mobile Switching Telephone Office (MSTO), and others), a data network (e.g., an Internet (sometimes alternatively known as the "World Wide Web"), an intranet, a local-area network (LAN), and/or a wide-area network (WAN)), and/or a satellite network that establishes the communications path(s) among the alternate voice/data communications device 800 and the intermediate host communications device 140.

FIGS. 9 and 10 further illustrate the communications paths of a synchronization command 920 from the voice/data communications device 800 to the intermediate host communications device 140, of a synchronized object 925 from the intermediate host communications device 140 to downstream participant communications devices 142, 144, 146, and 148, and of a synchronization confirmation 1020 from the intermediate host network 900 to acknowledge a successful presentation of the synchronized object.

FIG. 11 is a flowchart illustrating an exemplary method of conducting a conference amongst intermediate host participants. Prior to the conference, a list of participant communications devices is initialized to determine an intermediate host communications device and a downstream participant communications device (Block 1100), and then, a library of digital objects and an Intermediate Host Conferencing Module are communicated to the intermediate host communications devices (Block 1102). Then, during the conference, a synchronization command is communicated from a host communications device to the intermediate host communications device (Block 1104). The Intermediate Host Conferencing Module of the intermediate host communications device receives the synchronization command and instructs the intermediate host communications device to (1) communicate a synchronized object with presentation instructions to downstream participants and (2) present the synchronized object to intermediate host communications device (Block 1106). After the synchronized object is presented to the participant communications devices, a synchronization confirmation is then received to acknowledge a successful (or, alternatively, unsuccessful) presentation of the synchronized object within the intermediate host network as described in further detail in some of the above embodiments (Block 1108). The method may also delay communication of a subsequent synchronized object until the synchronization confirmation is received from all of the downstream participant communications devices (Block 1110). The method may also include the intermediate host receiving a synchronization acknowledgment with a request from a particular downstream participant (Block 1112). For example, the synchronization acknowledgment may include a request to exit the conference. A conferencing management command may be sent similar to the synchronized object or, alternatively with the synchronized object, such that supplemental commands and/or instructions (e.g., command that enables a selected downstream participant to email the library to a non participant) may also be communicated to a selected downstream participant communications device (Block 1114). And, finally, the method may include the host communicating a synchronization override command that allows a selected intermediate host communications device to present any object from the library of digital objects to the associated downstream participant communications devices (Block 1116).

The Intermediate Host Conferencing Module may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Intermediate Host Conferencing Module to be easily disseminated. A computer program product for conducting a conference amongst intermediate host participants includes the Intermediate Host Conferencing Module stored on the computer-readable medium. The Intermediate Host Conferencing Module initializes the intermediate host conference amongst at least one intermediate host communications device and at least one downstream participant communications device. Prior to the intermediate host conference, the Intermediate Host Conferencing Module communicates a library of digital objects and the Intermediate Host Conferencing Module to the intermediate host communications device(s). During the conference, the intermediate host-resident Intermediate Host Conferencing Module receives a synchronization command and instructs the intermediate host communications device to communicate a synchronized object with presentation instructions to the downstream participant communications device and to present the synchronized object to the intermediate host communications device. Furthermore, the participant communications devices may communicate a synchronization acknowledgment back to the Intermediate Host Conferencing Module. The synchronization confirmation acknowledges a successful presentation (or, alternatively, a failed presentation or alternate information) of the synchronized object to the intermediate host communications device and/or to at least one of the downstream participant communications devices.

The Intermediate Host Conferencing Module may also be physically embodied on or in any addressable (e.g., HTTP, I.E.E.E. 802.11, Wireless Application Protocol (WAP)) wireline and/or wireless communications device capable of presenting an IP address. Examples could include a computer, a wireless personal digital assistant (PDA), an Internet Protocol mobile phone, or a wireless pager.

While this invention has been described with respect to various features, aspects, and embodiments, those skilled and unskilled in the art will recognize the invention is not so limited. Other variations, modifications, and alternative embodiments may be made without departing from the spirit and scope of this invention.

What is claimed is:

1. A method of conducting a conference, comprising:
   initializing the conference amongst at least one intermediate host communications device and at least one downstream participant communications device;
   prior to the conference,
      communicating a library of digital objects to the intermediate host communications device,
      communicating an intermediate host conferencing module to the intermediate host communications device; and
   during the conference,
      communicating a synchronization command from a host communications device to the intermediate host communications device, wherein in response to the synchronization command, the intermediate host conferencing module instructs the intermediate host communications device to present an object from the library of digital objects and to communicate the object to the downstream participant communications device with presentation instructions to the downstream participant communications device to present the object,
      communicating the object with the presentation instructions from the intermediate host communications device to the downstream participant communications device, and
      communicating the object with the presentation instructions for another downstream participant communications device from the intermediate host communications device to the downstream participant communications device, wherein the downstream participant communications device communicates the object with the presentation instructions to the another downstream participant communications device; and
   receiving, at the intermediate host communications device, a synchronization acknowledgment from the at least one downstream participant communications device.

2. The method of claim 1, wherein the intermediate host conferencing module further communicates a conferencing management command to the downstream participant communications device, the conferencing management command comprising at least one of (i) a command to exit the conference, (ii) a command to delay presentment of the conference, (iii) a synchronization override command to access to any object from the library of digital objects, (iv) authority to distribute the object to a non-participant, (v) authority to modify the object, (vi) a command to terminate further communication of the synchronization acknowledgement, and (vii) a command to modify a communication connection of the conference.

3. The method of claim 1, wherein the synchronization acknowledgement confirms a successful presentation of the object to at least one of the intermediate host communications device and the downstream participant communications device.

4. The method of claim 1, further comprising delaying communication of a subsequent synchronization command until the synchronization acknowledgment is received from the intermediate host communications device to the host communications device.

5. The method of claim 1, wherein the synchronization acknowledgment further provides at least one of (i) a request to exit the conference, (ii) a request to delay presentment of the conference, (iii) a request to access to a non-synchronized digital object, (iv) a request for authority to distribute the object to a non-participant of the conference, (v) a request for authority to modify the object, and (vi) a request to terminate further communication of the synchronization acknowledgement.

6. The method of claim 3, further comprising:
   ignoring receipt of the synchronization acknowledgment from a selected downstream participant communications device, thus allowing the selected downstream participant communications device to request any object from the intermediate host communications device via the intermediate host conferencing module, such that the requested object is communicated with presentation instructions from the intermediate host communications device to the downstream participant communications device.

7. The method of claim 1, wherein initializing the conference amongst the intermediate host communications device and the downstream participant communications device comprises:
   accessing a list of intermediate host communications devices and downstream participant communications devices, and
   communicating the list of intermediate host communications devices and downstream participant communications devices to at least one of the intermediate host communications device and the downstream participant communications device.

8. The method of claim 1, wherein initializing the conference amongst the intermediate host communications device and the downstream participant communications device further comprises:
   analyzing transmission rates between at least two participant communications devices and between the host communications device and each of the at least two participant communications devices to determine the intermediate host communications device and the downstream participant communications device.

9. The method of claim 1, wherein initializing the conference amongst the intermediate host communications device and the downstream participant communications device further comprises at least one of:
   analyzing a cost factor between at least two participant communications devices and another cost factor between the host communications device and each of the at least two participant communications devices to determine the intermediate host communications device and the downstream participant communications device, analyzing a reliability factor between at least two participant communications devices and another reliability factor between the host communications device and each of the at least two participant communications devices to determine the intermediate host communications device and the downstream participant communications device, and analyzing a security factor between at least two participant communications devices and another security factor between the host communications device and each of the at least two participant communications devices to determine the intermediate host communications device and the downstream participant communications device.

10. The method of claim 1, further comprising:
    prior to the conference,
       verifying the intermediate host communications device has local access to the library of digital objects, and verifying an available communications connection between the intermediate host communications device and the downstream participant communications device.

11. A system, comprising:
means for initializing the conference amongst at least one intermediate host communications device and at least one downstream participant communications device;
prior to the conference,
means for communicating a library of digital objects to the intermediate host communications device,
means for communicating an intermediate host conferencing module to the intermediate host communications device; and
during the conference,
means for communicating a synchronization command from a host communications device to the intermediate host communications device, wherein in response to the synchronization command, the intermediate host conferencing module instructing the intermediate host communications device to present an object from the library of digital objects and to communicate the object to the downstream participant communications device with presentation instructions to the downstream participant communications device to present the object,
means for communicating the object with the presentation instructions from the intermediate host communications device to the downstream participant communications device, and
means for communicating the object with the presentation instructions for another downstream participant communications device from the intermediate host communications device to the downstream participant communications device, wherein the downstream participant communications device communicates the object with the presentation instructions to the another downstream participant communications device; and
means for receiving, at the intermediate host communications device, a synchronization acknowledgment from the at least one downstream participant communications device.

12. The system of claim 11, further comprising means for communicating the object with the presentation instructions to the downstream participant communications device.

13. The system of claim 1, further comprising means for communicating a conferencing management command to the downstream participant communications device, the conferencing management command comprising at least one of (i) a command to exit the conference, (ii) a command to delay presentment of the conference, (iii) a synchronization override command to access to any object from the library of digital objects, (iv) authority to distribute the object to a non-participant, (v) authority to modify the object, (vi) a command to terminate further communication of the synchronization acknowledgement, and (vii) a command to modify a communication connection of the conference.

14. The system of claim 11, wherein the synchronization acknowledgement confirms a successful presentation of the object to at least one of the intermediate host communications device and the downstream participant communications device.

15. The system of claim 11, further comprising means for delaying communication of a subsequent synchronization command until the synchronization acknowledgment is received from the intermediate host communications device to the host communications device.

16. The system of claim 11, wherein the synchronization acknowledgment comprises at least one of (i) a request to delay presentment of an object, (ii) a request to access a non-synchronized digital object, (iii) a request for authorization to distribute the object to a non-participant of the conference, (if) a request for authorization to modify the object, and (v) a request to terminate further communication of the synchronization acknowledgement.

17. The system of claim 11, further comprising means for accessing a list of intermediate host communications devices and downstream participant communications devices.

18. The system of claim 11, further comprising means for communicating the list of intermediate host communications devices and downstream participant communications devices to at least one of the intermediate host communications device and the downstream participant communications device.

19. The system of claim 11, further comprising means for analyzing transmission rates between at least two participant communications devices and between the host communications device and each of the at least two participant communications devices to determine the intermediate host communications device and the downstream participant communications device.

20. A computer program product comprising a computer readable storage medium storing processor executable instructions for performing a method, the method comprising:
initializing the conference amongst at least one intermediate host communications device and at least one downstream participant communications device;
prior to the conference,
communicating a library of digital objects to the intermediate host communications device,
communicating an intermediate host conferencing module to the intermediate host communications device; and
during the conference,
communicating a synchronization command from a host communications device to the intermediate host communications device, wherein in response to the synchronization command, the intermediate host conferencing module instructing the intermediate host communications device to present an object from the library of digital objects and to communicate the object to the downstream participant communications device with presentation instructions to the downstream participant communications device to present the object,
communicating the object with the presentation instructions from the intermediate host communications device to the downstream participant communications device,
communicating the object with the presentation instructions for another downstream participant communications device from the intermediate host communications device to the downstream participant communications device, wherein the downstream participant communications device communicates the object with the presentation instructions to the another downstream participant communications device, and
receiving, at the intermediate host communications device, a synchronization acknowledgment from the at least one downstream participant communications device.

* * * * *